No. 792,057. PATENTED JUNE 13, 1905.
J. H. LEWIS & L. G. KUNZER.
COUPLING FOR LOCOMOTIVE ENGINES AND TENDERS.
APPLICATION FILED NOV. 21, 1904.

Witnesses:
Wm. Geiger
H. W. F. Hunday

Inventors:
John H. Lewis
Louis G. Kunzer
By Munday, Evarts & Adcock
Attorneys

No. 792,057.

Patented June 13, 1905.

UNITED STATES PATENT OFFICE.

JOHN H. LEWIS AND LOUIS G. KUNZER, OF CHICAGO, ILLINOIS.

COUPLING FOR LOCOMOTIVE ENGINES AND TENDERS.

SPECIFICATION forming part of Letters Patent No. 792,057, dated June 13, 1905.

Application filed November 21, 1904. Serial No. 233,638.

*To all whom it may concern:*

Be it known that we, JOHN H. LEWIS and LOUIS G. KUNZER, citizens of the United States, residing in Chicago, in the county of Cook and State of Illinois, have invented a new and useful Improvement in Couplers for Locomotive Engines and Tenders, of which the following is a specification.

Our invention relates to improvements in couplers for locomotive engines and tenders.

The object of our invention is to provide a locomotive engine or tender coupler of a strong, simple, efficient, and durable construction adapted to permit the necessary lateral swinging movement and be readily adjusted to the proper height above the rails as the locomotive-tires wear away or the springs weaken and which may be quickly and easily removed and replaced.

Our invention consists in the means we employ to practically accomplish this object or result—that is to say, it consists in a coupler, preferably of the ordinary Master Car-Builders' type, having an integral shank furnished with a rounded or partial cylindrical pivot-head with plain flat upper and lower faces and a socket-piece secured to or forming part of the locomotive or tender frame and having a partial cylindrical socket receiving and filling said head and furnished with angle stops or shoulders adapted to engage the shank of the coupler to limit the lateral or swinging movement of the coupler, in connection with a removable cap-plate secured to said socket-piece and removable filler-plates, one or more of which may be placed above or below the pivot-head of the coupler, according as the condition of the tires and springs may require to bring the coupler to the proper level.

Our invention also consists in the novel construction of parts and devices and in the novel combinations of parts and devices herein shown or described.

Figure 1:
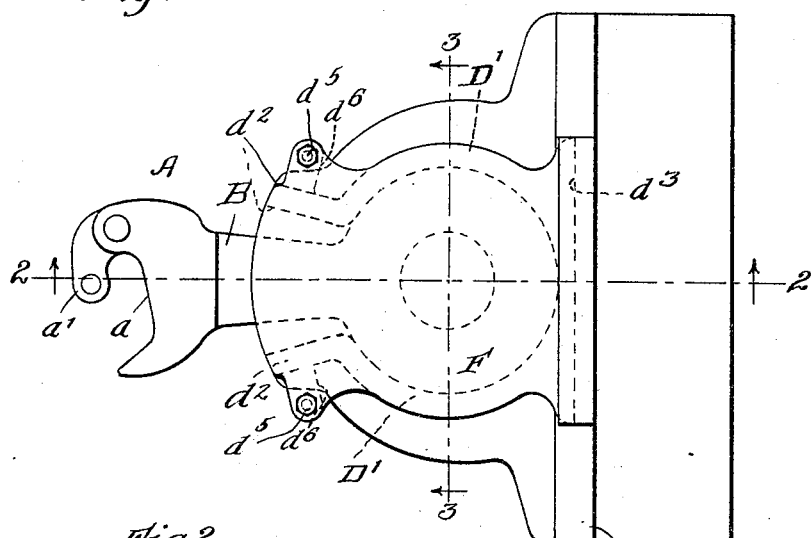
Figure 2:
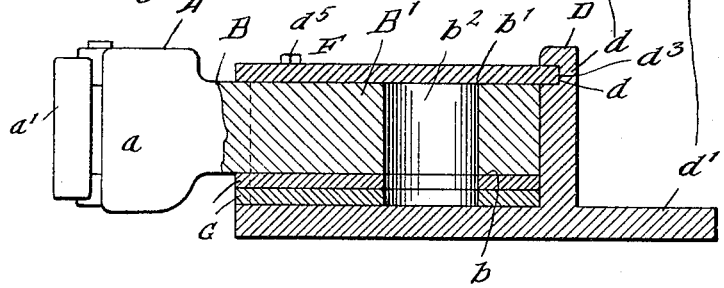
Figure 3:
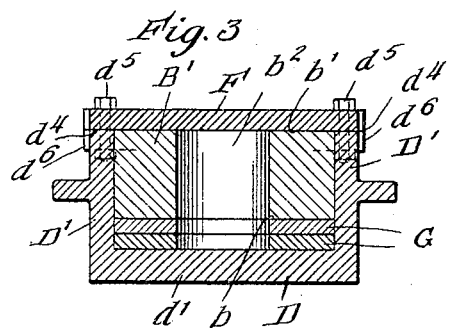
Figure 4:
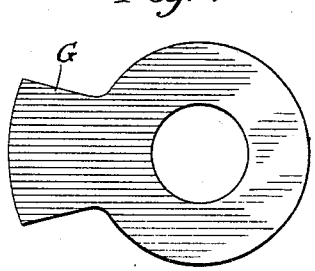

In the accompanying drawings, forming a part of this specification, Figure 1 is a plan view of a locomotive or tender coupler embodying our invention. Fig. 2 is a vertical longitudinal section on line 2 2 of Fig. 1. Fig. 3 is a cross-section on line 3 3 of Fig. 1, and Fig. 4 is a detail plan view of one of the removable filler-plates.

In the drawings, A represents a coupler of the Master Car-Builders' type and having a forked head $a$ and pivotal knuckle $a'$. The coupler A has an integral shank B, furnished with an integral rounded or partial cylindrical pivot-head B'. The pivot-head B' has a flat bottom face $b$ and a flat top face $b'$ and is preferably provided with a central opening $b^2$, so that when the outer periphery of the cylindrical head becomes worn by use or the socket in which it fits the head may be swaged out after being heated, and thus enlarged, so that it will again properly fit its socket.

D is a socket-piece having upright and horizontal flanges $d$ and $d'$ for attachment to the front sill or framework of the locomotive or tender. This socket-piece D is preferably of cast metal and furnished with a partial cylindrical socket D', adapted to receive and fit the cylindrical pivot-head B' of the coupler. The socket-piece D is further provided with angle shoulders or flanges $d^2$, which serve as stops to limit the lateral or swinging movement of the coupler from side to side as the train passes around curves. The socket-piece D is further provided just back of the socket D' with a slot or groove $d^3$ to receive the rear edge of the flat cap-plate F, which fits on top of the rim $d^4$ of the socket D' and is removably secured thereto by bolts $d^5$, which extend through ears or lugs $d^6$ on the socket-piece. The flat cap-plate F is thus secured in place by the bolts at its front end and by the groove in the cap-piece at its rear end.

G G are removable flat filler-plates corresponding in outline to the socket D' in the socket-piece D. By placing one or more of these removable filler-plates above or below the coupler, as may be required, the coupler may be adjusted to the proper level or height, and thus compensate for the wear of the locomotive-tires or the sagging of the springs or other causes tending to vary the height of the coupler.

When the pivot-head B' or its socket D' becomes worn, so that there is too much play, the pivot-head B' may be enlarged by simply heating the same and drifting or swaging it out to a larger external diameter.

We claim—

1. A coupler for locomotives or tenders having a shank furnished with an integral cylindrical pivot-head, having flat upper and lower faces, in combination with a socket-piece having a cylindrical socket receiving and fitting said pivot-head of the coupler, and provided with shoulders or stops to limit the lateral or swinging movement of the coupler, a cap-plate removably secured to said socket-piece above the pivot-head of the coupler, and removable filler-plates fitting in the socket of the socket-piece to adjust the height of the coupler, substantially as specified.

2. A coupler for locomotives or tenders having a shank furnished with an integral cylindrical pivot-head, having flat upper and lower faces, in combination with a socket-piece having a cylindrical socket receiving and fitting said pivot-head of the coupler, and provided with shoulders or stops to limit the lateral or swinging movement of the coupler, a cap-plate removably secured to said socket-piece above the pivot-head of the coupler, said socket-piece having a groove to receive the rear end of said cap-plate, and removable filler-plates fitting in the socket of the socket-piece to adjust the height of the coupler, substantially as specified.

3. A coupler for locomotives or tenders having a shank furnished with an integral cylindrical pivot-head, having flat upper and lower faces, in combination with a socket-piece having a cylindrical socket receiving and fitting said pivot-head of the coupler, and provided with shoulders or stops to limit the lateral or swinging movement of the coupler, and a cap-plate removably secured to said socket-piece above the pivot-head of the coupler, said pivot-head of the coupler having an eye or opening therein to adapt it to be drifted or swaged out to a larger external diameter when it becomes worn, substantially as specified.

JOHN H. LEWIS.
LOUIS G. KUNZER.

Witnesses:
H. M. MUNDAY,
JOHN W. MUNDAY.